(No Model.) 2 Sheets—Sheet 1.
C. B. HITE.
COLLAPSIBLE GLOBE FOR EDUCATIONAL PURPOSES.
No. 357,994. Patented Feb. 15, 1887.
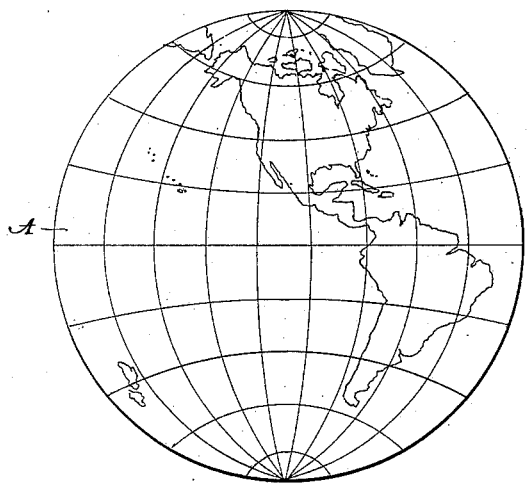
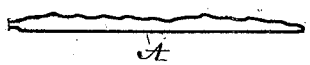
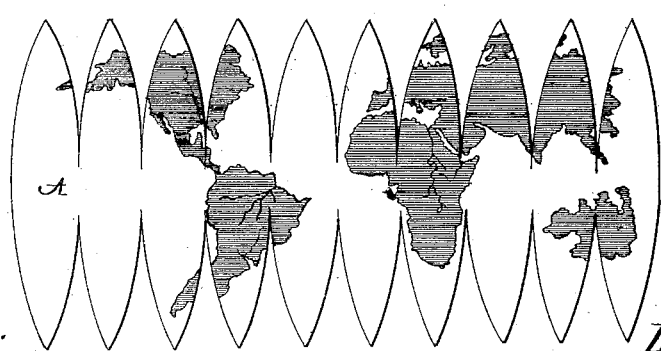
Witnesses:
N. W. Mortimer
David H. McLeod
Inventor:
Cornelius B. Hite,
by R. G. Dyrenforth
his Attorney

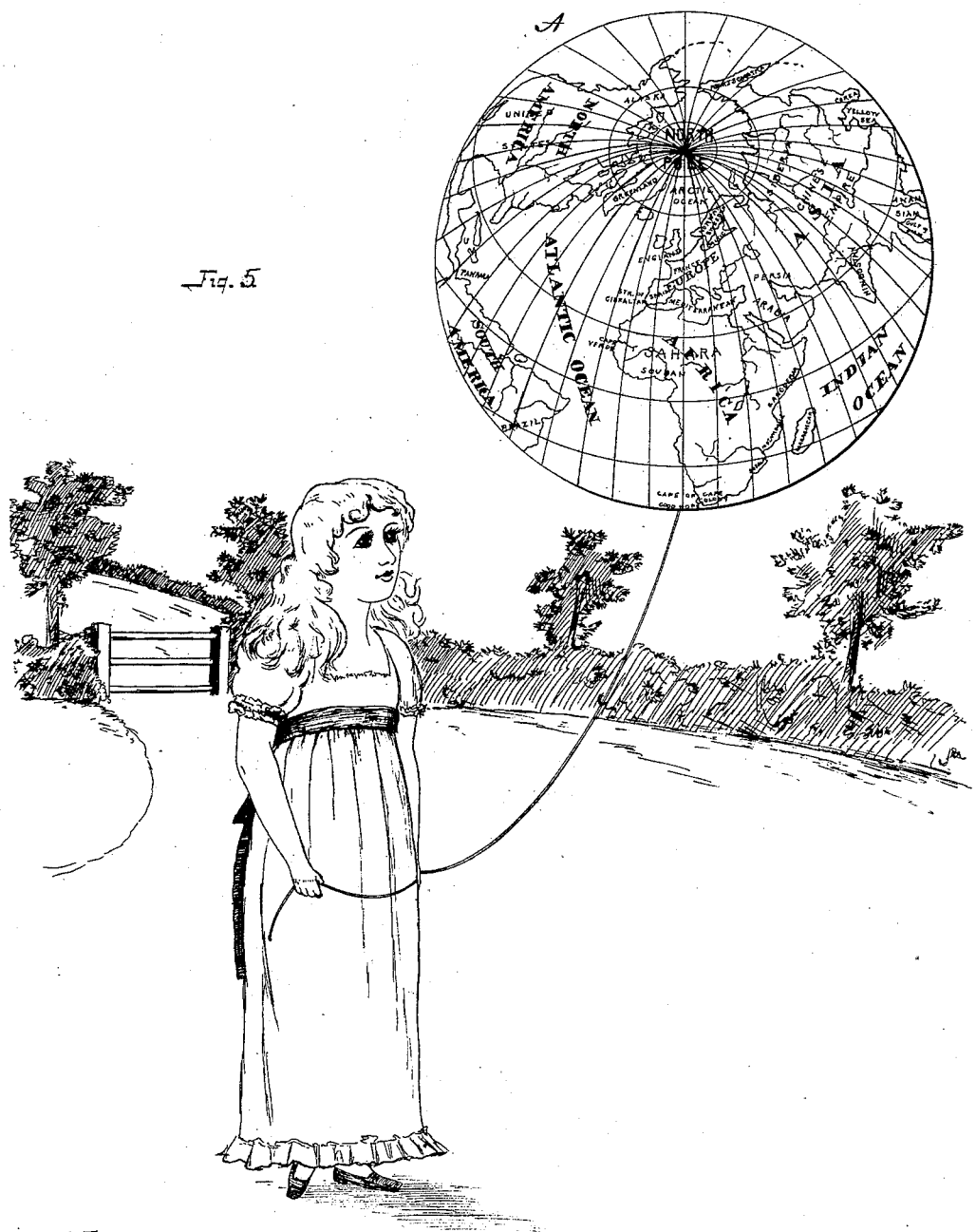

UNITED STATES PATENT OFFICE.

CORNELIUS B. HITE, OF WASHINGTON, DISTRICT OF COLUMBIA, ASSIGNOR OF ONE-HALF TO ROBERT G. DYRENFORTH, OF SAME PLACE.

COLLAPSIBLE GLOBE FOR EDUCATIONAL PURPOSES.

SPECIFICATION forming part of Letters Patent No. 357,994, dated February 15, 1887.

Application filed April 27, 1886. Serial No. 200,318. (No model.)

*To all whom it may concern:*

Be it known that I, CORNELIUS B. HITE, a citizen of the United States, residing at Washington, in the District of Columbia, have invented certain new and useful Improvements in Educational Globes; and I do hereby declare the following to be a full, clear, and exact description of the invention, such as will enable others skilled in the art to which it appertains to make and use the same.

This invention relates to collapsible geographical and astronomical or descriptive globes designed for educational and other purposes.

The object is to produce a globe which shall be of ready construction, of comparatively small cost, and which shall be made of material which is quite durable, thereby particularly adapting it for use by small children; and, furthermore, the object of the invention is to produce a globe of the kind above described which shall be capable of presentation to young children in such an attractive form as to interest, amuse, and at the same time instruct them.

With these objects in view my invention resides, essentially, in a collapsible globe consisting of a single shell made of strong and at the same time flexible, elastic, or other material provided directly upon its surface, by printing, painting, or the like, with geographical, astronomical or other instructive delineations, the shell to be distended by a fluid, preferably by an aeriform fluid, such as air or gas, but especially by some aeriform fluid lighter than air, whereby the globe will be buoyant, in the nature of a balloon.

I have illustrated the invention in the accompanying drawings, in which Figure 1 represents a side elevation of a globe made in accordance with my invention; Fig. 2, a vertical section of a globe, showing the manner in which the shell or envelope may be arranged for printing, in this figure one-half of the matter designed to be represented having just been impressed upon the upper surface; Fig. 3, a similar view showing the shell arranged to present a plane surface to receive an imprint, as before, and one-half of the matter designed to be represented imprinted on the lower surface. Fig. 4 represents a modified form of shell; Fig. 5, the globe as it will appear when inflated with light gas and used as a balloon.

In these drawings, A represents the shell, which is preferably composed of the substance usually employed in making the ordinary toy balloons, of thin rubber, or of some light fabric coated or saturated with some substance which will render it air-tight. The shell may be of one or more layers. The shell is provided at a suitable point, preferably, where large bodies of water are represented, or at the South pole when illustrations of a geographical nature are delineated, with an opening having projecting lips capable of receiving a cord or the like for binding them closely together and preventing the escape of the fluid introduced into the interior; but it is to be understood that the shell may be closed in any other suitable manner, as by sealing or by a valve or a vent-plug. The shell is designed particularly for representing a terrestrial or celestial globe, and to that end is so arranged as to receive an imprint either from a cut or in any other suitable manner, representing two hemispheres upon appropriate sides of the shell.

In order to adapt the shell to receive the proper imprint I arrange it either as shown in Figs. 2, 3, or 4.

In Fig. 2 the shell is shown as arranged to present the under surface to receive an imprint of the body to be represented.

In Fig. 3 I have shown the shell as arranged to present the upper surface to receive the imprint. The shell may be arranged for receiving the imprint by placing it upon molds, by stretching, or by arranging it in any other manner. In the form I have described I have contemplated making the globe in the form of a collapsed bag made in two or more pieces, and so that when inflated with fluid of any description it will assume the form of a sphere; but it is to be understood that it may assume any other instructive form, as that of the planet Saturn.

In Fig. 4 I have shown a modified form of shell. In this form the shell is made of one piece of material, of a length corresponding to the circumference of the globe to be made, and provided along its edges with slits of such form that when the edges of the slitted portions are joined together, by cementing or otherwise, the whole will form a globe. The form first described is, however, considered preferable.

I contemplate inflating the shell with any suitable fluid either aeriform or liquid, and, if desired, it may be filled with a light gas, in order to render the globe buoyant in the air.

It is intended that the shell shall contain but the distending-fluid; but where a light gas is employed, only so that the globe will float in the air, it makes no difference whether there be anything else within the shell or not.

The surface of the globe may be made to represent and impart instruction in astronomy, in political or physical geography, or in descriptive geography, showing in their appropriate zones the beasts and birds, &c., of the earth.

Although I have shown the shell as bearing the representation of the world, it will be understood that I do not limit myself to this representation, as any desired delineation or representation of an instructive nature may be used.

Having thus fully described my invention, what I claim, and desire to secure by Letters Patent, is—

1. As a new article of manufacture, a single self-collapsible shell, its surface representing the earth or other described body, as set forth.

2. As a new article of manufacture, a terrestrial or celestial globe consisting of a self-collapsible shell directly distended by a suitable fluid.

3. As a new article of manufacture, a globe consisting of a single shell of india-rubber or other suitable flexible material, having the representation of geographical or other suitable educational or instructive matter directly upon its surface and distended by a suitable fluid alone.

4. As a new article of manufacture, a globe consisting of a collapsible shell formed of india-rubber or other suitable material having the impression of geographical or other educational or instructive matter directly upon its surface, and having its interior filled with light gas, substantially as described.

In testimony whereof I affix my signature in presence of two witnesses.

CORNELIUS B. HITE.

Witnesses:
R. G. DYRENFORTH,
E. T. WHITE.